US006358598B1

(12) United States Patent
Hicks

(10) Patent No.: US 6,358,598 B1
(45) Date of Patent: Mar. 19, 2002

(54) DECORATIVE TRANSLUCENT WINDOW COVERING

(76) Inventor: Thomas Hicks, 17957 NW. Sauvie Island Rd., Portland, OR (US) 97231

( * ) Notice: Subject to any disclaimer, the term of this patent is extended or adjusted under 35 U.S.C. 154(b) by 0 days.

(21) Appl. No.: 09/416,361

(22) Filed: Oct. 12, 1999

(51) Int. Cl.[7] .................................................. B32B 3/00

(52) U.S. Cl. ....................... 428/203; 428/195; 428/201; 428/913; 428/913.3

(58) Field of Search ............................. 428/542.6, 913, 428/913.3, 195, 201, 203

(56) References Cited

U.S. PATENT DOCUMENTS

| | | | | | |
|---|---|---|---|---|---|
| 3,931,425 | A | | 1/1976 | Kuroda | 428/38 |
| 4,070,781 | A | | 1/1978 | Sauer | 40/219 |
| 4,078,492 | A | | 3/1978 | Levy | 101/426 |
| 4,127,689 | A | | 11/1978 | Holt | 428/38 |
| 4,225,369 | A | | 9/1980 | Felchlin | 156/71 |
| 4,283,451 | A | * | 8/1981 | Abrahami | 428/182 |
| 4,312,688 | A | | 1/1982 | Brodis et al. | 156/71 |
| 4,320,174 | A | * | 3/1982 | Rabinovitch et al. | 428/403 |
| 4,863,782 | A | * | 9/1989 | Wang | 428/204 |
| 5,021,278 | A | * | 6/1991 | Short | 428/195 |
| 5,202,180 | A | * | 4/1993 | Watts | 428/324 |
| 5,217,791 | A | * | 6/1993 | Fujita et al. | 428/204 |
| 5,258,214 | A | * | 11/1993 | Cooledge et al. | 428/43 |
| 5,273,796 | A | * | 12/1993 | Elbing et al. | 428/195 |
| 5,887,393 | A | * | 3/1999 | Vanark et al. | 52/208 |

OTHER PUBLICATIONS

"Development Timeline", Tom Hicks, 1996–1999. No month.

"Self–clinging vinyl blocks harmful UV rays", undated advertisement for Solar Stat self–adhering vinyl film product (Silvohome Product–admitted prior art) No date.

"Borders for Kids" advertisement, 1996, no month.

"EtchArt, Inc" advertisement, date unknown (but admitted prior art—date on facsimile copy Jul. 12, 1999).

* cited by examiner

*Primary Examiner*—Cathy F. Lam
(74) *Attorney, Agent, or Firm*—Klarquist Sparkman LLP

(57) ABSTRACT

A flexible plastic window covering which combines the qualities of being translucent, colorful, easily installed in any size, self-adhering, removable and reusable, easily cleaned, wear and fade resistant, ultraviolet light absorbing, and decorative while providing privacy or hiding an unwanted view.

12 Claims, 1 Drawing Sheet

TRANSPARENT

OPAQUE

TRANSLUCENT

DECORATIVE TRANSLUCENT WINDOW COVERING

BACKGROUND

1. Field of Invention

Figure 1:
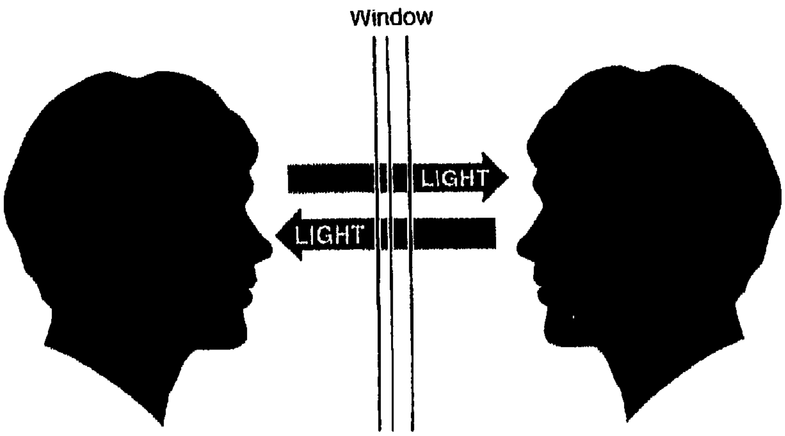

This invention relates generally to window coverings. Specifically, coverings which combine the qualities of being translucent, colorful, easily installed, self-adhering, removable and reusable, easily cleaned, wear and fade resistant, ultraviolet light absorbing, and decorative while providing privacy or hiding an unwanted view.

2. Discussion of the Prior Art

A number of inventions provide window coverings. Each has its own unique qualities. No covering to date has been able to combine all of the qualities of the present invention into one product.

One product uses static electricity to secure thermoplastic films to walls and windows. Cooledge, et al., U.S. Pat. No. 5,258.214 discloses the use of a thin oriented plastic material which is either transparent or opaque and which holds a static charge for removably securing the film to a surface. An image is imparted to the plastic material.

One of the problems with the Cooledge invention is that the thermoplastic oriented plastic material contemplated requires an electrostatic charge to adhere to a surface. Over time the static charge may lessen, and the material fail to adhere to the desired surface. The static charge can also be affected by humidity, and again fail to adhere to the desired surface. The present patent uses a plastic sheet which is not reliant on static electricity for adhesion, but rather adheres through cohesion and atmospheric pressure. Once in place, the product remains in place. for years, unaffected by humidity or gravity, in effect remaining in place until removed.

The Cooledge patent does not contemplate providing a translucent image on the surface, and is not designed to produce the translucent effect of the present patent. Significantly, the present patent creates a translucent image, capable of transmitting light through it but not capable of being seen through, which is beyond the scope of the Cooledge patent.

The Cooledge patent does not contemplate the use of ultraviolet light inhibitors or hardening agents to preserve the image, both of which are used in the present patent to preserve the image.

Finally, the Cooledge patent has no provision for tiling of the images together, as that is not the intent of the patent. In the present patent, the images may be tiled together to fit any size window.

The property of translucency is such a significant achievement that another product, Fujita, et al., U.S. Pat. No. 5,217,791, bases its entire patent on attaining translucency on a film sheet prior to the application of an image. A transparent film sheet is coated with pigments and adhesives in such a manner so that when an image is subsequently printed on the coated transparent film sheet (in a separate process), the coating absorbs the inks and the image is viewable from both sides. The coating is placed on the sheet through means of a coating device. The coated sheet is said to have the quality of translucency prior to the printed image being placed on it. The improvement of the present invention is the printed image is done in such a manner as to provide translucency, thereby eliminating the need to use a separate product which combines pigments and adhesives prior to applying the image to the sheet. In other words, the present invention eliminates the need for the Fujita product altogether. Furthermore, the Fujita product does not touch upon the qualities of being easily installed, removable, reusable, self-adhering, harmless to itself and the surface applied to, trimmed to fit smaller windows or tiled together to fit larger windows, reduction of UV transmission, and coated with a hardening agent to resist damage. These are all advantages of the present invention which is not covered by the Fujita patent.

Another product attempts to achieve translucency through a different process. Levy, et al., U.S. Pat. No. 4,078,492 discloses the making of a decorative stained glass effect window shade which is attached at one end to a spring loaded roller for raising and lowering the window shade. The Levy invention contemplates the use of any of numerous flexible plastic films with printing applied to it. The printed film is then embossed or laminated with an embossed or frosted film or layer to achieve the desired privacy.

The Levy patent has two major shortcomings when compared to the present invention. First, Levy embosses or laminates an embossed or frosted film or layer to achieve the desired level of privacy. The present invention achieves translucency in the printing process and does not require embossing or a lamination, thereby eliminating this step entirely.

Second, the Levy patent uses a mechanical device to achieve a window shade which has a stained glass effect image placed upon it. Such a device is not easily installed or removed and does not typically completely cover the window. Windows come in such a large number of sizes, most applications would require custom production of the device. Thus, the Levy patent does not allow for easy sizing or for tiling of the shades together. The present invention can be made to cover the entire window in a translucent fashion which allows light to enter but provides maximum privacy. The present invention allows for windows smaller than the individual pieces by using a material which is simply trimmed using a razor blade type knife. For windows larger than the individual pieces, designs are provided which tile together to cover areas of any size.

Another difference is the Levy patent does not enable the shade to adhere to the window itself. In the present invention, the material self-adheres to the window and the present patent discloses a method to print a translucent image which allows light in but is not capable of being seen through from one side to the other, thereby insuring privacy of the occupant.

There are other unpatented products which use printed images or uniform coatings or colorings to decorate windows:

Home Details, St. Paul, Minn., markets a type of covering to trim the edges of windows, mirrors, and showers and provide accents to the same. The Home Details product has a printed image and is trimmed to decoratively edge windows. The covering is not design for covering the entirety of the window and UV protection is not addressed. The present invention covers the entirety of the window and provides excellent UV protection.

The Home Details product has images which are opaque, surrounded by areas of transparency. The product is only suitable for use as an accent or border. The present invention has images which are translucent and which are suitable for covering the entire window, not merely the accents or borders.

EtchArt, Inc., of Longwood, Florida markets a window covering which claims to be an alternative to decorating with etched glass. The EtchArt product only contemplates an etched glass effect. There is no provision for use of colored images to achieve a stained glass effect on the covering which the present patent achieves.

Silvohome of Rolling Meadows, Illinois markets a self-clinging vinyl for use as a window covering which is uniformly coated in a clear, bronze or grey coloring. There are no images on the covering which are contemplated in the present patent.

The Silvohome product is intended to block harmful ultraviolet rays and allow transparency so the view through the window is largely unobstructed. The present product, while protecting from harmful UV light, is specifically designed to allow light in but deny visibility from either side.

SUMMARY

The present invention provides the user with a window covering which allows privacy or improves a bad view while also being translucent, colorful, easily installed in any size, easily cleaned, self-adhering, removable and reusable, wear and fade resistant, ultraviolet light absorbing and decorative.

OBJECTS AND ADVANTAGES

Objects

Accordingly, several objects of the invention are: To provide a window covering comprised of:

(a) An easily installed, easily cleaned, removable and reusable plastic sheet which (b) Self adheres through cohesion and atmospheric pressure whose (c) Application and removal is harmless to itself and the surface applied to which (d) Is easily trimmed to fit smaller windows with a razor-knife and (e) Tiled together to fit larger windows and is (f) Printed with colored inks in a decorative manner so as to provide (g) An attractive translucent image which allows light to pass through yet (h) Provides for privacy or improves a bad view by diffusing the light while (i) Reducing the transmission of ultraviolet rays through the covering which (j) Greatly increases the time it takes the image to fade and which also (k) Protects persons and things inside the windows from harmful UV rays and (l) Is coated with a hardener to resist damage.

Advantages

The advantage of the present invention is that it greatly simplifies the process of obtaining a translucent effect on a window covering while providing a vividly colored decorative image on a transparent substrate.

The present invention uniquely achieves this effect by using layers of inks and varnishes to produce a translucent effect which disperses and diffuses light evenly. Light is allowed to pass through the printed image while creating a background for obtaining intense color saturation of the printed image. The result is an exciting visual effect when illuminated by daylight or room light. The invention allows light to pass through but objects are not discernable through the material, providing privacy or hiding an unwanted view. The image is visible from both sides of the substrate.

The present invention is not obvious in its approach. The most obvious means of printing on a transparent substrate is to first apply opaque white to the material so that any image that is printed on top of the white background would have brilliant colors (like printing on a white opaque paper material). An image so printed would be opaque and visible from only one side. This method of printing has been successfully achieved on transparent substrates.

One means of achieving an image which can be viewed from both sides would be to print the image on a transparent sheet, cover the image with opaque white, then reprint the image again. Thus, the image could be seen from either side of the sheet, but it would not achieve the desired translucency, instead being entirely opaque.

Another means of printing on a transparent substrate would be to eliminate the white background and print transparent inks onto the substrate. The disadvantage of this method is that it would be difficult to obtain the necessary quantities of inks to provide acceptable color saturation since light passing through the transparent material and ink would tend to make the printed image pale because there is no reflective background. Objects could still be viewed through the transparent substrate and inks. This would be distracting for viewing the printed image and creating privacy would not be achieved.

No inventor or producer has previously successfully combined inks, varnishes and coatings in such a manner as to achieve the desired translucent effect while obtaining intense color saturation of imagery in one process. That achievement, when combined with the other enumerated properties comprises the current patent's uniqueness and unobviousness.

DRAWING FIGURES

FIG. 1 is a graphic representation of a window with a covering which is transparent. The arrows depict the transmission of light through the window, which is neither diffused nor diffracted. Each person can clearly see persons and objects on the other side of the window and covering.

Figure 2:
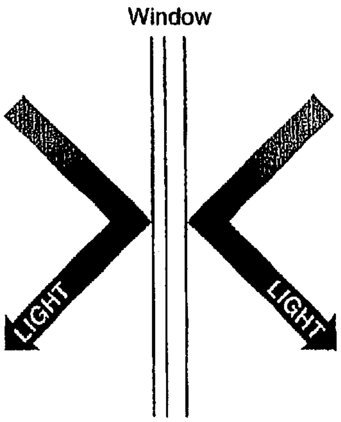

FIG. 2 is a graphic representation of a window with a covering which is opaque. Light (depicted by the arrows) does not pass through but is either reflected or absorbed by the covering.

Figure 3:
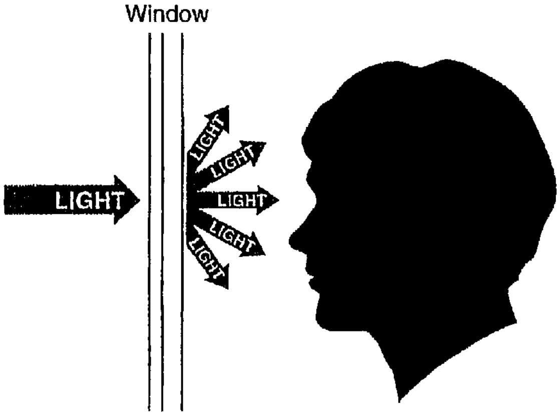

FIG. 3 is a graphic representation of a window with a covering which is translucent. Light rays (arrows) are diffused when passing through the covering. Though light passes through, persons and objects on the other side are not discernable. The present invention successfully embodies this property of translucency as depicted in FIG. 3.

DESCRIPTION

Preferred Embodiment

The process is applied to a clear plastic substrate containing UV inhibitors in its makeup. A particularly excellent material for the specified use is a highly plasticized, calendared, flexible, polyvinyl chloride film, sometimes referred to as "vinyl" or "static vinyl" in thickness ranging from 4 mils to 10 mils, preferably 8 mils. The sheet of film has first and second opposed surfaces bounded by a periphery. The invention has been very successfully created using "Plasticling 0.008 clear Non/Top Coated Static Cling Vinyl with a 10 pt. base liner." This material self adheres to a nonporous surfaced by means of atmospheric pressure and cohesion.

Printing is done through the use of a UV cured lithographic printing press. All of the inks used in the process are transparent, contain UV inhibitors, and are applied thickly. Cyan, magenta, yellow and black inks are individually applied and dried. The order of application can be varied and the invention has been successfully accomplished using different orders of application.

The next step is the application and drying of a matte varnish. The varnish is applied using a half tone positive or half tone negative to produce a variable layer with a translucent matte finish.

After application and drying of the matte varnish, magenta, yellow, and cyan inks are individually applied and dried. Again, the order of application can be varied and the invention has been successfully accomplished using different orders of application.

Finally, a flood matte varnish topcoat containing UV inhibitors, a hardening agent and opaciters in an amount small enough to remain translucent is applied and dried.

In summary, the invention has been successfully produced by use of UV offset lithography using 4-color process, matte varnish using a half tone negative or positive, three additional touch plates (cyan, magenta and yellow), and one UV varnish with opaciters added as a topcoat. The inks used were sunfast UV inks cured with ultra violet interdeck drying units.

CONCLUSION RAMIFICATIONS AND SCOPE OF INVENTION

Thus the reader will see the window covering provides an easily applied means of providing privacy or improving an unwanted view, while allowing diffused light to enter (the property of translucency) and giving the window an exciting visual effect, similar to an illuminated stained glass window. Images can include reproductions of actual stained glass windows, paintings, photographs, patterns, etc. No special expertise is required to apply the covering to a window and can be done by virtually anyone. Since the printing process involves the use of thickly applied inks, matte varnishes, UV inhibitors, and hardening agents, the finished product is fade resistant, protects the interior from the harmful effects of ultraviolet light, and is resistant to damage by scratching. The covering is easily removed and a different image can be placed upon the window at the users whim without damage to either the covering or the window. The covering that was removed may be placed elsewhere and thereby reused over and over again. The covering is easily cleaned using mild soap and water.

While the preferred embodiment contains many specificities, these should not be construed as limitations on the scope of the invention, but rather as one exemplification. A number of other variations are possible. For example, there are numerous clear or nearly clear plastics which exhibit many of the characteristics of vinyl and would be a suitable substrate. It is possible to print the images by going through less steps than described. It is also possible to print the images by use of other processes including silkscreen printing. The covering may be made larger by fitting them together like wallpaper, however, small single image pieces may be produced. The application can be to a window with a view outside, or to windows inside the structure. The application may be to windows, skylights, light boxes, mirrors, low heat florescent ceiling lights, lamp shades, glass cabinet doors, lighted doors, etc.

Accordingly, the scope of the invention should be determined not by the embodiment described, but by the appended claims and their legal equivalents.

I claim:

1. A window covering comprised of:

(a) a thin, flexible, non-laminated single layer film of plastic material, having a thickness between 4 mil and 10 mil which self-adheres to a non-porous surface through cohesion and atmospheric pressure;

(b) the film of plastic being printed on only one side thereof with a colored translucent image allowing light to pass through but diffusing it so that objects on either side cannot be clearly distinguished from the other side, whereby the user is provided with an easily installed and removable, visually exciting, colorful window covering which is translucent, that is, it allows light to pass through but which cannot be clearly seen through and the image is visible from both sides.

2. A window covering according to claim 1 further including:

(a) said colored translucent image contains sunfast UV inks, ultra-violet light absorbing varnishes, and hardening coatings causing the covering to absorb most of the ultra-violet light and resisting damage, whereby the window covering described in claim 1 has been printed and coated in such a manner as to substantially resist the effects of ultraviolet light, protect the interior contents from the harmful effects of ultraviolet light, and is highly resistant to scratching and other types of damage.

3. A window covering according to claim 2 further including:

(a) images which consist of designs that tile together to fill spaces larger than the individual pieces, whereby the window covering described in claim 2 may be made to fit almost any size window.

4. A window covering comprising:

a transparent flexible substrate of a plastic material which self-adheres to a nonporous surface;

the substrate having intermediate layers of ink of at least two colors applied thereto to form a portion of an image on the substrate, the inks being transparent and being applied in successive steps with the ink of each color being dried before application of the ink of a subsequent color;

an intermediate half-tone layer applied over the dried inks to render the substrate and inks translucent;

additional intermediate layers of transparent ink of at least two colors applied over the half-tone layer, the ink of the additional intermediate layers being transparent and being applied in successive steps with the ink of each color being dried before ink of a different color is applied; and a top coat over the additional intermediate layers.

5. A window covering according to claim 4 in which inks applied prior to the intermediate half-tone layer include four colors of ink selected from magenta, yellow, cyan and black and in which the inks applied following the half-tone layer are selected from the colors cyan, magenta and yellow.

6. A window covering according to claim 5 in which the intermediate half-tone layer comprises a layer of varnish with variable quantities of the varnish positioned over different portions of the underlying inks and substrate.

7. A window covering comprising:

a substrate of a non-laminated single layer sheet of material which self-adheres to a nonporous surface, the sheet having first and second opposed surfaces;

a plural colored image overlaying and adhered to at least a portion of only one of the surfaces of the sheet and defining an image on said surface portion;

a topcoat overlaying the plural colored image; and at least a portion of the image being translucent.

8. A window covering according to claim 7 in which the entire image is translucent.

9. A window covering according to claim 7 in which the image is formed by plural colors of ink.

10. A window covering comprising:

a substrate of a sheet of material which self-adheres to a nonporous surface, the sheet having first and second opposed surfaces;

a plural colored image overlaying and adhered to at least a portion of one of the surfaces and defining an image on said surface portion;

a topcoat overlaying the plural colored image;

at least a portion of the image being translucent; and wherein the image is formed by a first set of plural colors of ink separated from a second set of plural colors of ink by an intermediate translucent layer.

11. A window covering according to claim 10 in which the image is a reproduction selected from a group comprising a stained glass window, a painting, a photograph and a pattern.

12. A window covering according to claim 7 in which the image is a reproduction selected from a group comprising a stained glass window, a painting, a photograph and a pattern.

* * * * *